March 15, 1932.  A. F. MASURY  1,849,765
SPRING MOUNTING FOR INDIVIDUAL WHEELS
Filed June 10, 1930  2 Sheets-Sheet 1
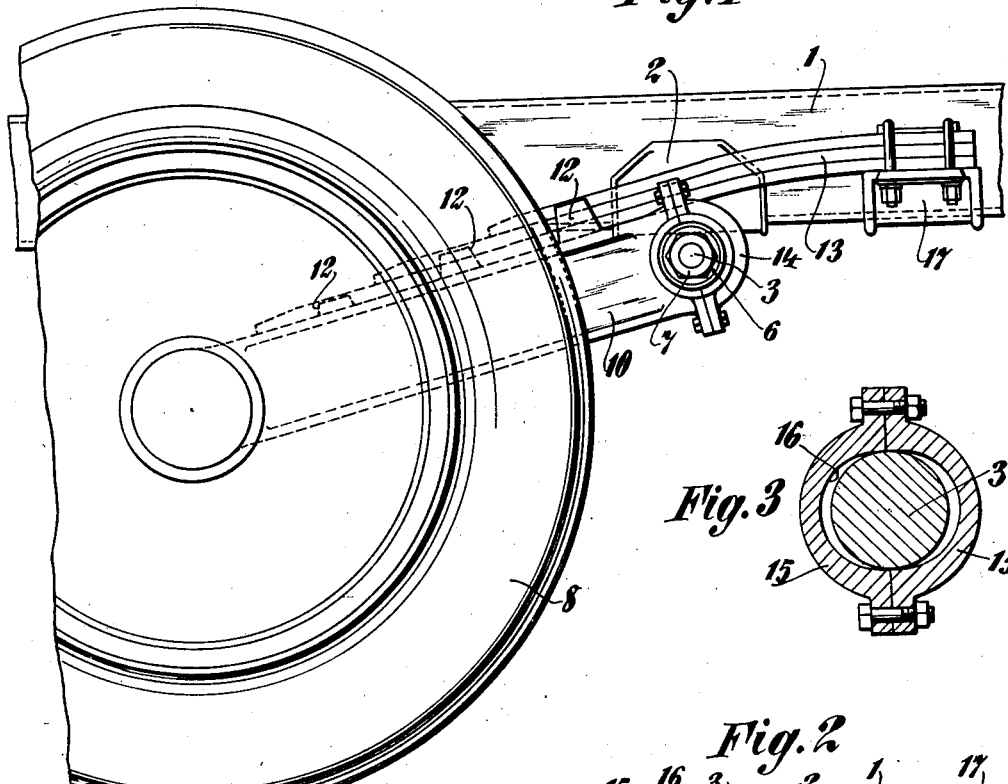
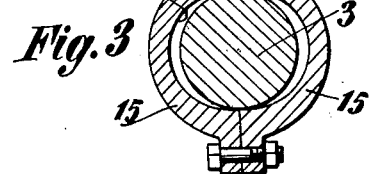
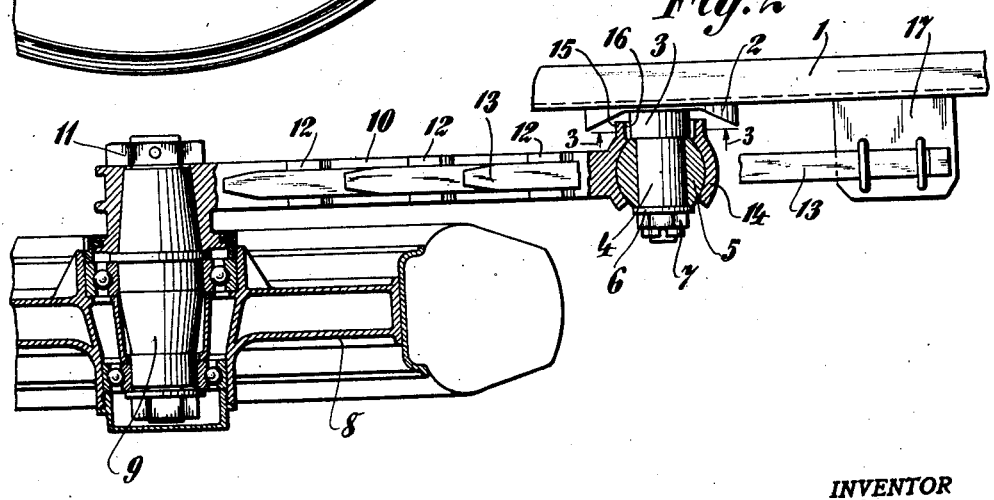
INVENTOR
Alfred F. Masury,
BY
HIS ATTORNEYS

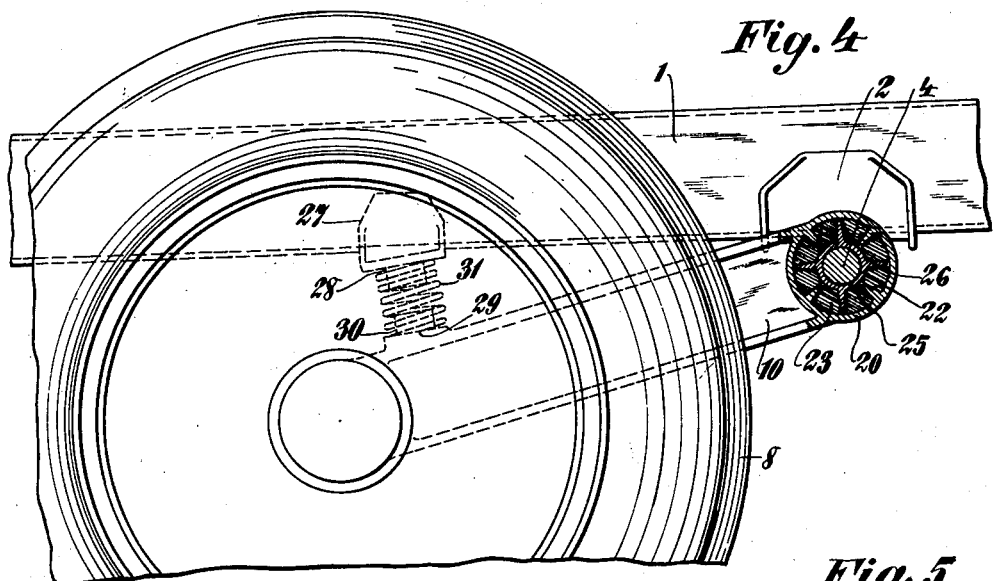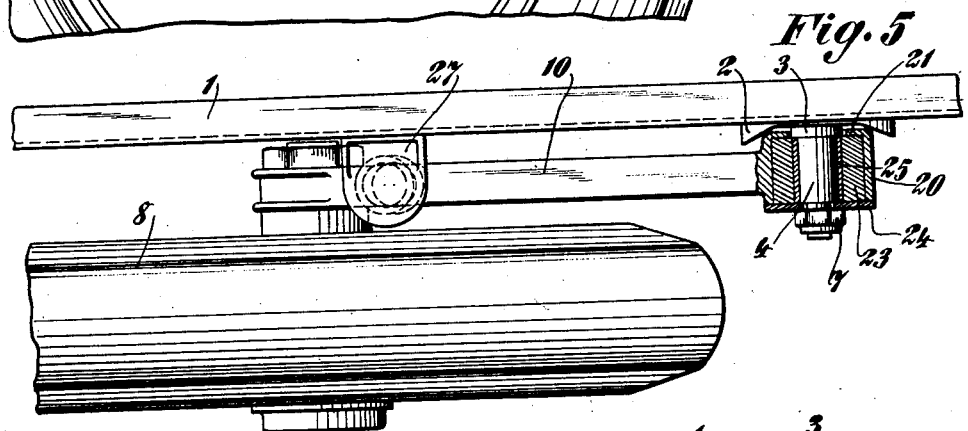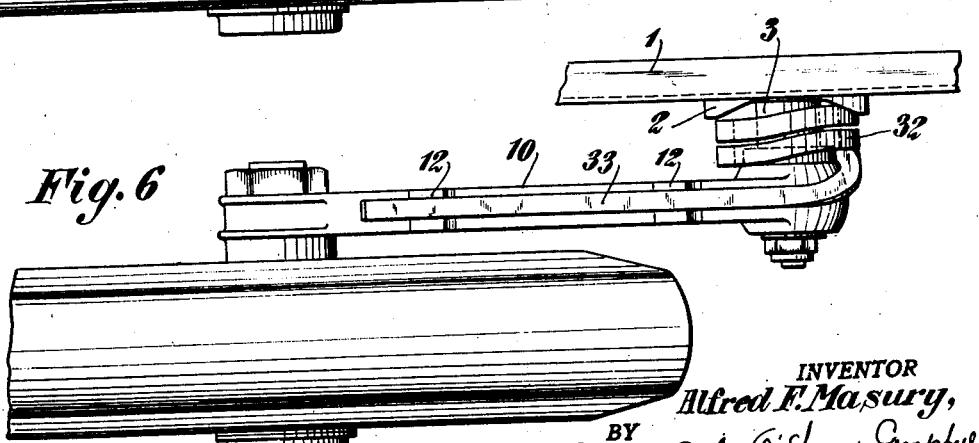

Patented Mar. 15, 1932

1,849,765

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

SPRING MOUNTING FOR INDIVIDUAL WHEELS

Application filed June 10, 1930. Serial No. 460,120.

The present invention relates to spring suspensions for motor vehicles and embodies, more specifically, an improved suspension for individually mounted wheels, such wheels having capacity for free movement independently of the other wheels of the vehicle.

Individual wheel mountings have been designed and used heretofore, such mountings embodying an arm pivotally mounted upon the vehicle frame with provision for movement in a vertical plane parallel to the longitudinal axis of the vehicle. It will be apparent, where a plurality of such wheel mountings are provided, that, upon turning a corner, the movement of the vehicle will be such as to impress upon certain of the individually mounted wheels stresses tending to cause such wheels to move bodily toward or away from the vehicle. The purpose of the present invention therefore is to provide an independent mounting for a single wheel, such mounting affording a degree of lateral movement of the wheel with respect to the vehicle, in addition to the usual movement of the wheel in a vertical plane parallel to the longitudinal axis of the vehicle.

A further object of the invention is to provide an improved wheel mounting by means of which the load carried by the vehicle may be effectively cushioned against gravitational forces, the lateral stresses set up when the vehicle is turning a corner additionally being cushioned to prevent destruction of the parts, at the same time permitting a desired degree of such movement in order that the wheel may track properly when the vehicle is turning a corner.

A further object of the invention is to provide a wheel mounting which is characterized by great strength, in addition to being simple in construction and readily applied and serviced.

Further objects, not specifically enumerated above, will be apparent as the invention is described in greater detail in connection with the accompanying drawings, wherein:

Figure 1 is a view in side elevation, showing a wheel mounting constructed in accordance with the present invention.

Figure 2 is a plan view, partly broken away and in section, showing the wheel mounting of Figure 1.

Figure 3 is a view in section taken on line 3—3 of Figure 2, and looking in the direction of the arrows.

Figure 4 is a view in side elevation, partly broken away and in section showing a modified form of the invention.

Figure 5 is a plan view, partly broken away and in section, showing the construction of Figure 4.

Figure 6 is a plan view showing a further modified construction.

Referring particularly to Figures 1, 2, and 3, the side frame member of a motor vehicle is shown at 1 having secured thereto a bracket 2 provided with a stub shaft 3. The stub shaft is formed with a portion of reduced diameter 4, over which a spherical bearing member 5 is mounted. A washer 6 and nut 7 secures the bearing member upon the reduced portion 4 of shaft 3 and prevents the accidental removal thereof.

Wheel 8 is journaled upon a shaft 9 which is secured in the outer end of an arm 10 by means of nut 11.

Spaced lugs 12, increasing in height toward the shaft 3, are formed upon arm 10 and are adapted to receive, therebetween, the leaves of a spring 13, the height of the lugs 12 being sufficient to include all of the leaves of the spring at the position of such lugs. Adjacent the shaft 3, a spherical bearing member 14 is formed upon shaft 10, the member being split to permit assembly in an obvious fashion.

An inwardly projecting flange 15 is formed upon the bearing member 14, this flange being formed with an elongated opening 16, the shortest diameter of which corresponds to the diameter of shaft 3. In this fashion, collapse of the wheel 8 is prevented since twisting of the arm 10 about its own axis is thus prevented.

Upon bracket 17, secured to frame member 1, the leaf spring 13 is secured. By means of this construction it will be seen that the spring 13 not only cushions the gravitational forces due to the load of the vehicle upon the wheel, but also resists lateral movement of the wheel with respect to the frame member 1, such movement being limited by the engagement of the respective lugs 12 with the sides of spring 13.

With reference to the construction shown in Figures 4 and 5, the arm 10 is mounted upon shaft 3 in the manner described hereinafter. Over the reduced portion 4 of the shaft a bushing 25 is mounted, the bushing being provided with radially extending fins or flanges 26. At the adjacent end of arm 10, a cup-shaped recess 20 is formed, an inwardly extending flange 21 being formed therewith to serve as a lateral seat for the cushioning members described hereinafter. Inwardly extending fins or flanges 22 are formed in the cup-shaped recess 20 and are equal in number to the flanges 26. Between the fins 22 and 26, blocks of yielding non-metallic material 23 are mounted, these blocks preferably being assembled under compression to space the elements and resist, yieldingly, rotative movement of arm 10 about shaft 3. A cover plate 24 is mounted upon shaft 3, being secured in position by nut 7 and thus closing the aperture formed by the bearing cup 20. Sufficient clearance between the flange 21 and shaft 3 is maintained to afford a degree of lateral movement of shaft 10 with respect to the frame member 1, this lateral movement being resisted by the compression of certain of the blocks of yielding non-metallic material 23 in an obvious fashion.

To aid the blocks of yielding non-metallic material 23 in cushioning the gravitational load, a bracket 27 may be secured upon the frame member 1 and formed with a centering member 28. A cooperating land 29, formed with a centering member 30, is provided on the arm 10 and a spring 31 is mounted between the centering members 28 and 30.

In the construction shown in Figure 6, arm 10 is mounted upon shaft 3 in a manner similar to that described in connection with the construction shown in Figures 1, 2, and 3. Instead, however, of mounting a leaf spring upon the frame member 1 as in the construction shown in the above figures, a helical spring 32 is mounted over shaft 3 and secured at one end to the frame member 1. This spring is formed with an elongated extension 33 which is received between the lugs 12, thus resisting lateral movement of arm 10 with respect to the frame 1.

From the foregoing, it will be seen that a wheel mounting is provided which affords movement of the wheel laterally with respect to the frame, in addition to the vertical movement thereof in response to the cushioning of the gravitational load. While the invention has been described with specific reference to the accompanying drawings, it is not to be limited, save as defined in the appended claim.

I claim as my invention:

A mounting for an individually mounted wheel comprising an arm having a wheel journaled thereon, a supporting shaft, a spherical bushing on the shaft, a spherical bearing on the arm engaging the shaft, a flange on the arm forming an elongated recess to receive the shaft, the smallest diameter of which equals the diameter of the shaft, a plurality of spaced lugs upon opposite sides of the arm, and a leaf spring engaging the arm between the lugs.

This specification signed this 7 day of June A. D. 1930.

ALFRED F. MASURY.